C. F. FREIHOFER.
BAKING APPARATUS.
APPLICATION FILED JAN. 4, 1911.
1,127,224.
Patented Feb. 2, 1915.
6 SHEETS—SHEET 1.
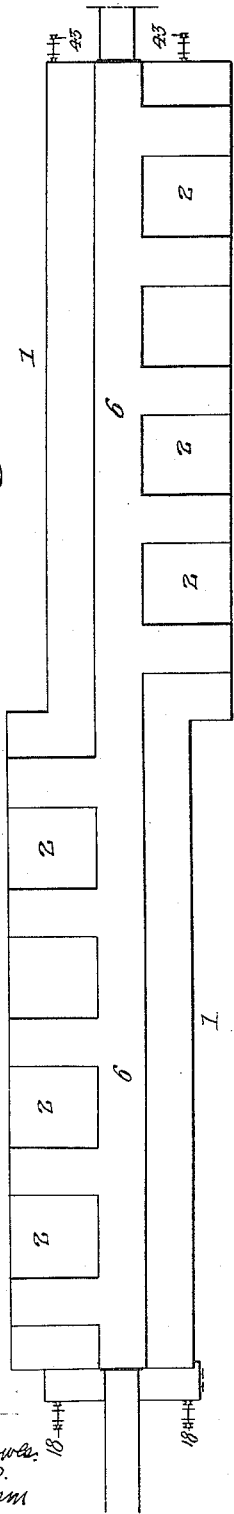
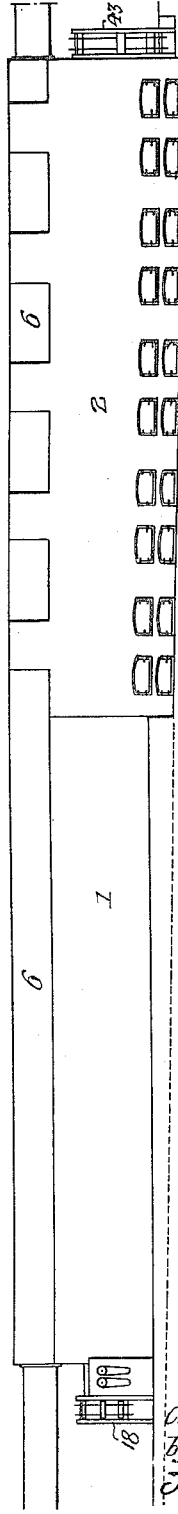

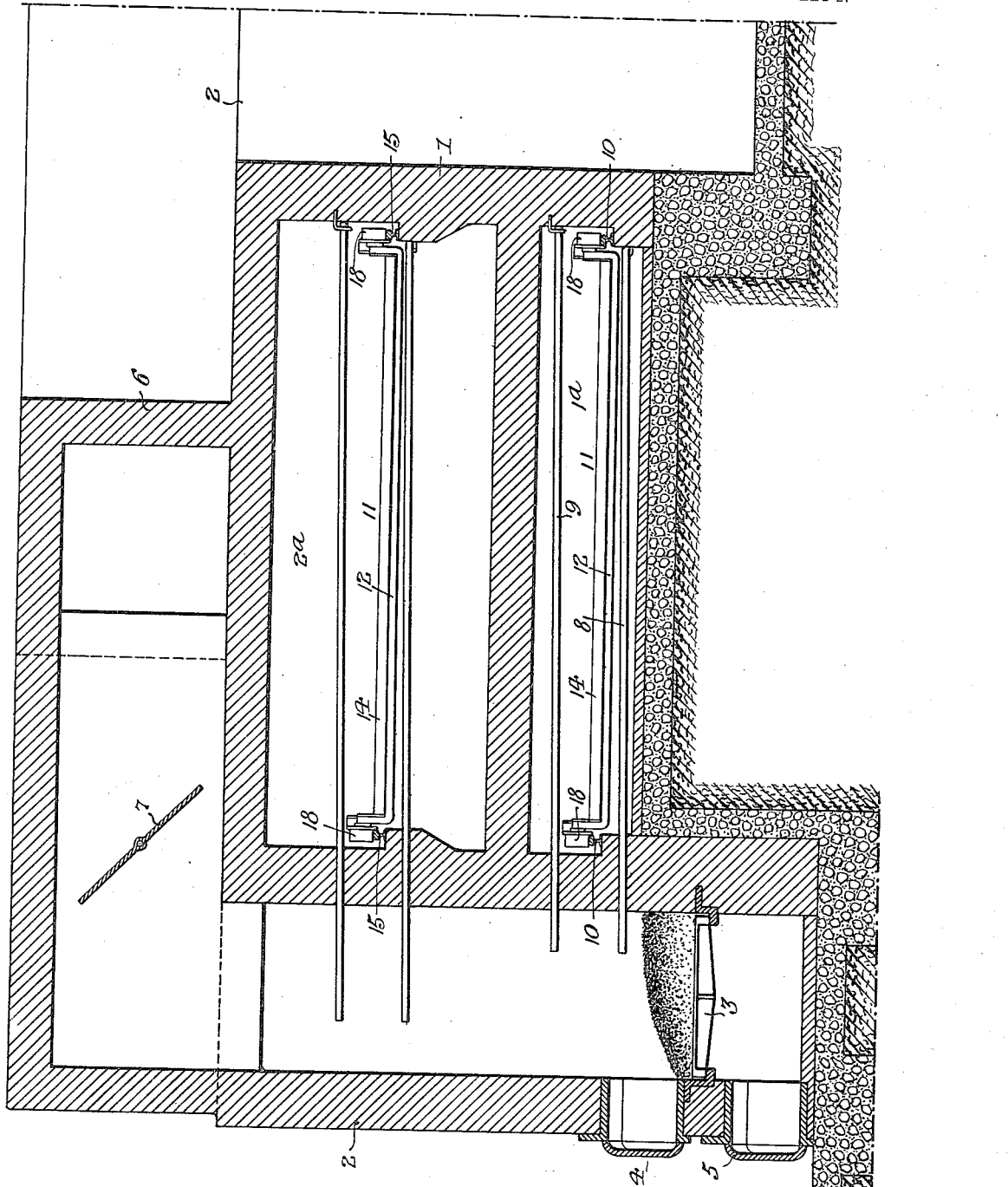

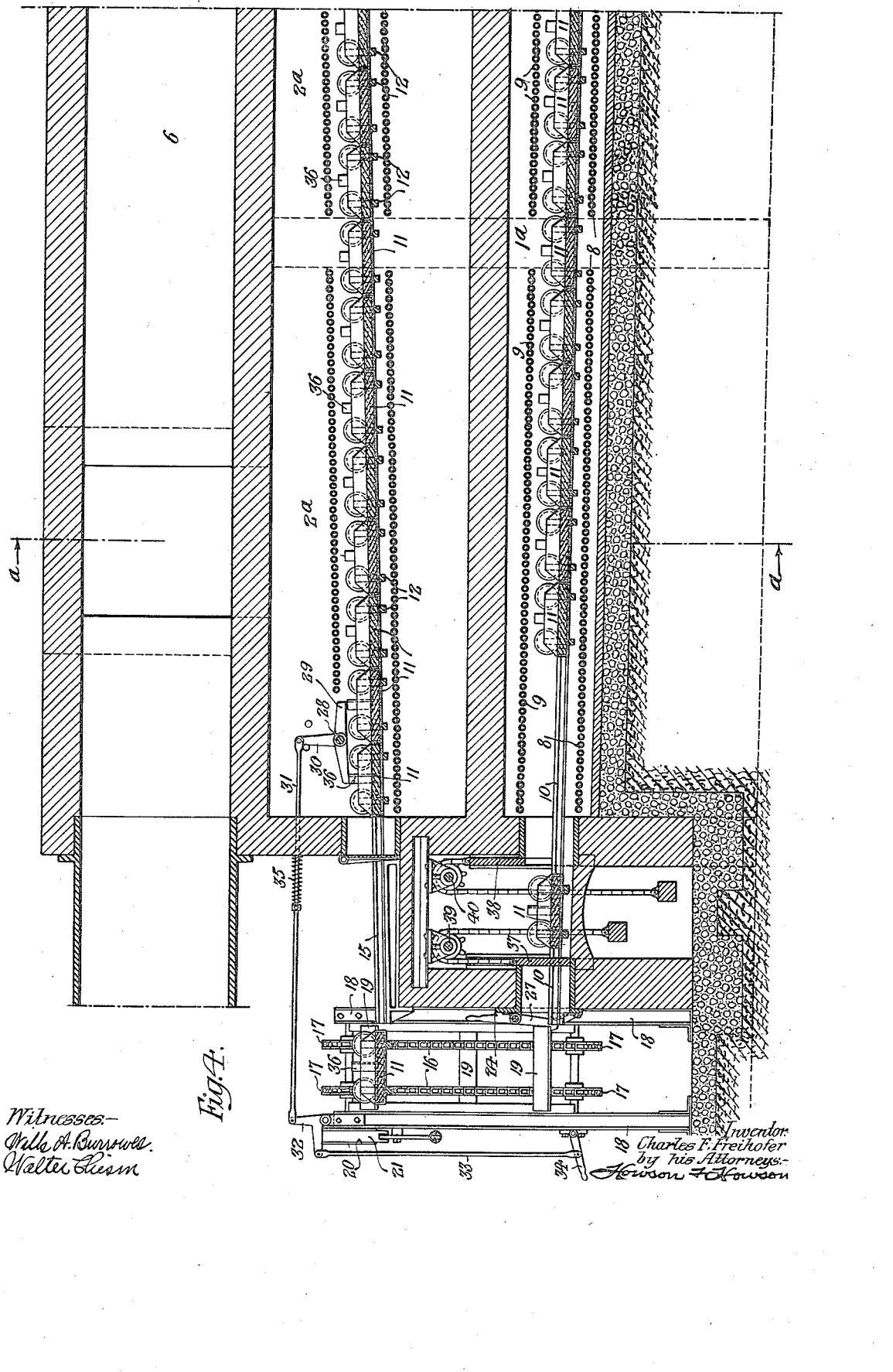

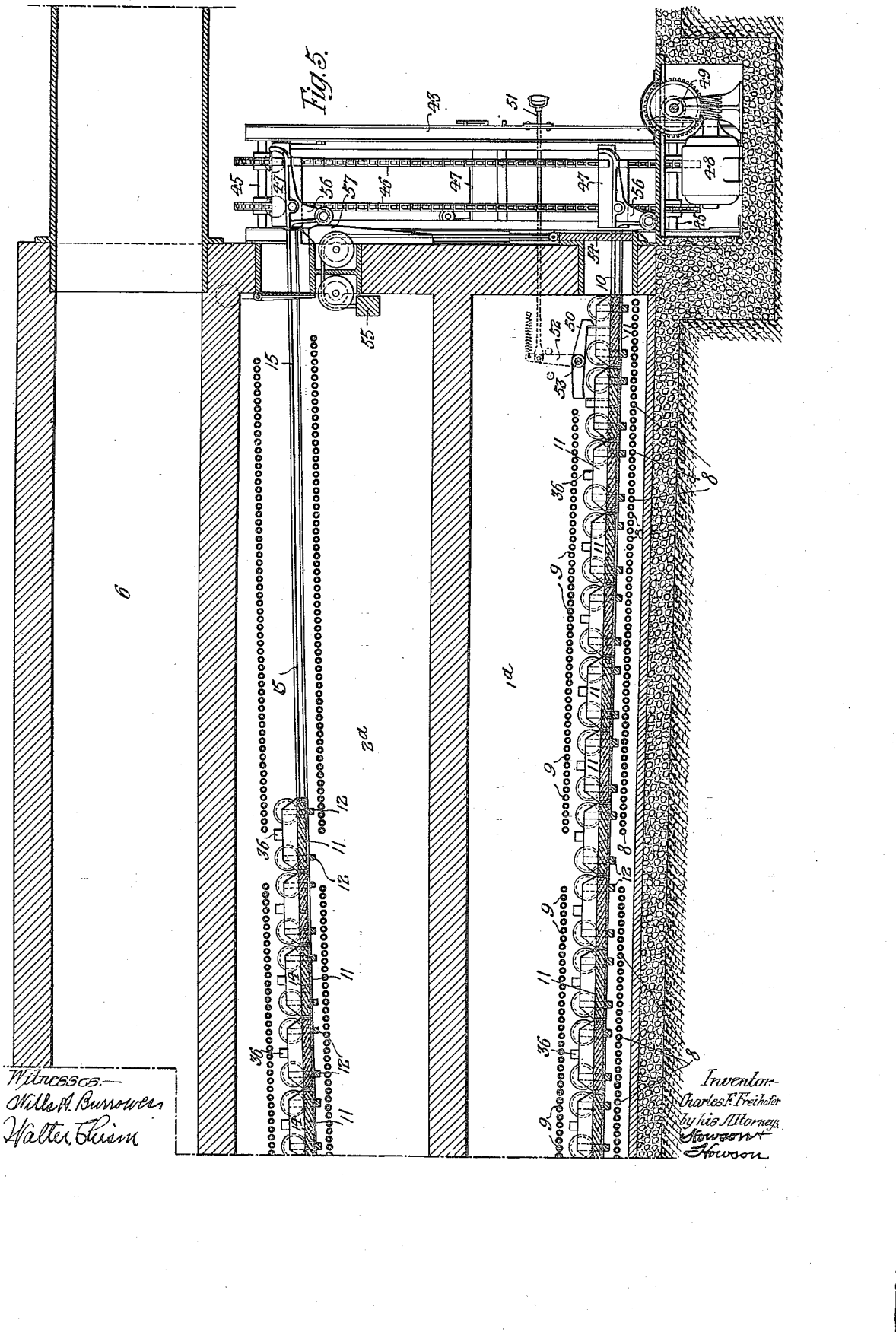

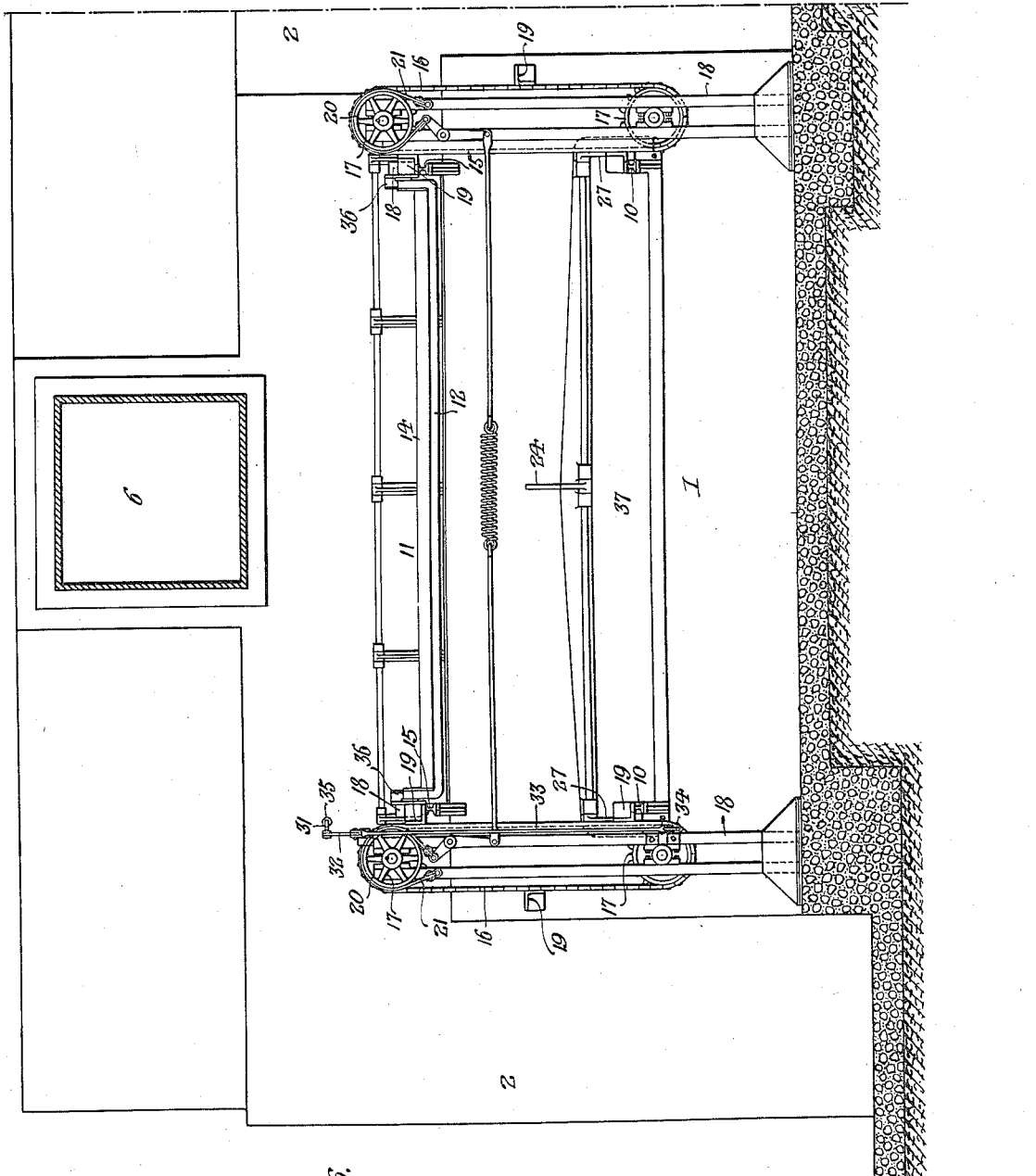

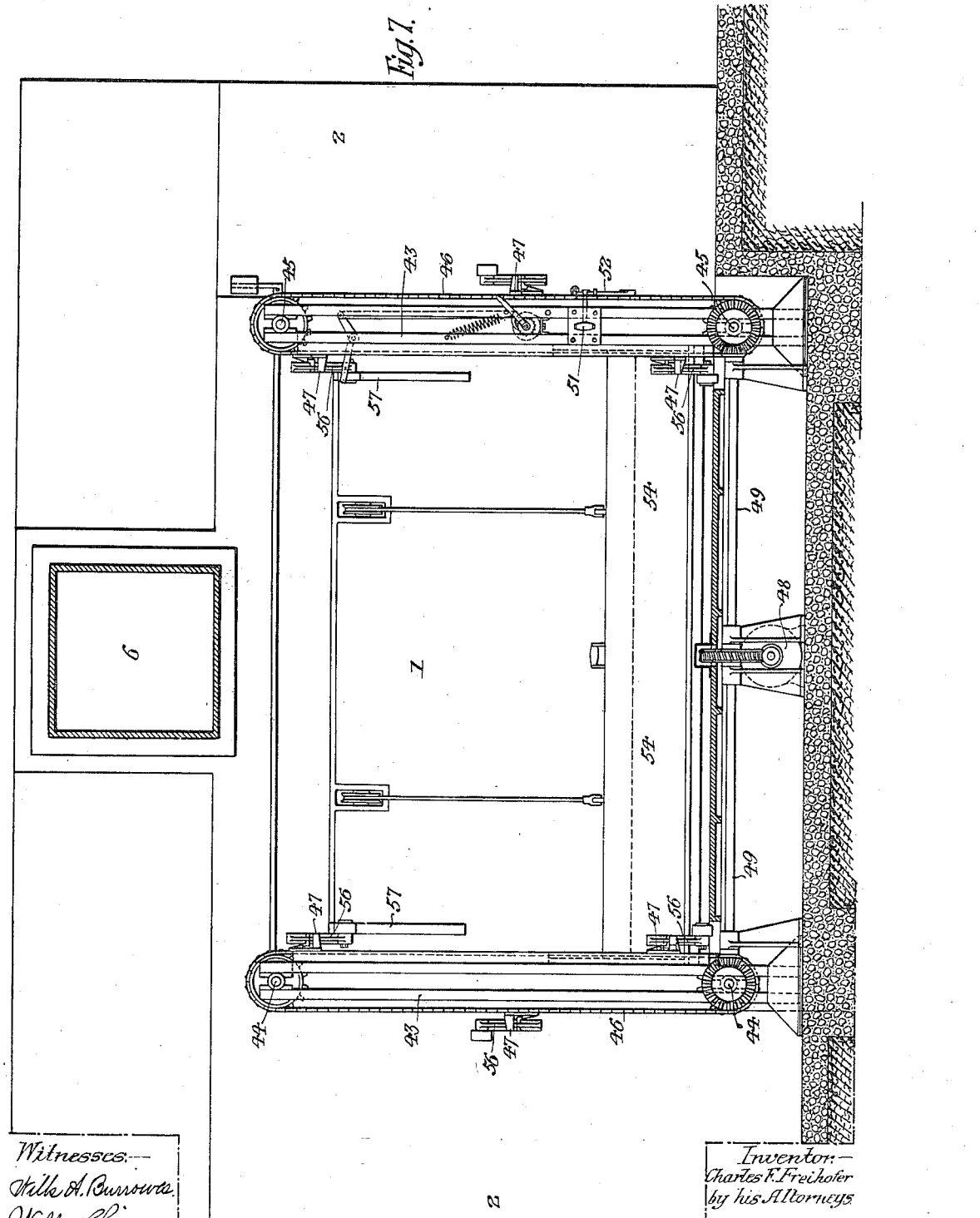

UNITED STATES PATENT OFFICE.

CHARLES F. FREIHOFER, OF PHILADELPHIA, PENNSYLVANIA.

BAKING APPARATUS.

1,127,224. Specification of Letters Patent. Patented Feb. 2, 1915.

Application filed January 4, 1911. Serial No. 600,721.

*To all whom it may concern:*

Be it known that I, CHARLES F. FREIHOFER, a citizen of the United States, residing in Philadelphia, Pennsylvania, have invented certain Improvements in Baking Apparatus, of which the following is a specification.

One object of my invention is to provide a baking machine or apparatus particularly designed for continuous operation, whose parts shall be so arranged as to particularly adapt it for working on a large scale, and which shall be so constructed as to be relatively simple, substantial and not likely to get out of order. I further desire to provide an apparatus of the above noted class in which a series of carriages carrying the material to be baked, shall move through an elongated heating chamber or oven under the influence of gravity; the invention also contemplating novel means whereby said carriages may be returned from the discharge end to the charging end of said chamber.

Another object of my invention is to provide a continuous baking apparatus having an elongated heating chamber or oven, with a novel arrangement of inlet and outlet doors, in combination with novel mechanism whereby the passage of carriages through said doors may be controlled at will.

These objects and other advantageous ends I secure as hereinafter set forth, reference being had to the accompanying drawings, in which:—

Figures 1 and 2 are respectively a plan and a side elevation on a reduced scale, illustrating a baking apparatus or machine constructed according to my invention; Fig. 3, is a transverse section on the line a—a, Fig. 4, illustrating the relative position of the heating chamber and one of the furnaces; Fig. 4, is a longitudinal vertical section illustrating the construction of the charging end of the machine shown in Fig. 1; Fig. 5, is a longitudinal vertical section illustrating the detail construction of the discharging end of the apparatus; and Figs. 6 and 7 are respectively elevations, partly in section, of the charging and discharging ends of the apparatus.

In the above drawings 1 is an elongated heating chamber or oven in which the baking is performed and it is preferably though not necessarily of a flat construction, its width being for example about five times its height. On opposite sides of this chamber are built furnaces 2 which may be of any desired construction, and in the present instance one set of these extends from one end to the middle of the heating chamber while the furnaces on the other side extend from the middle to the other end thereof; said furnaces being preferably made each having a grate 3 and fire and ash doors 4 and 5. A smoke flue 6 extends along the top of the oven and the flow of the products of combustion in said flue from any one of the furnaces may be controlled by suitable dampers 7. For transmitting heat from the furnaces to the oven I employ two sets of pipes 8 and 9, each of which constitutes an independent vessel containing mercury or other liquid capable of being heated to a high temperature without decomposition. These two series of tubes extend substantially parallel to each other throughout the entire length of the baking compartment 1ª of the heating chamber 1 and one end of each tube or container extends into the furnace 2; the tubes being inclined to the horizontal with their furnace-heated ends lower than the other parts. Moreover, the tubes 8 are spaced away from the tubes 9 to provide a passageway in which carriages or movable hearths 11 are designed to operate. For the purpose of supporting these latter I provide tracks 10 mounted on suitable shoulders or brackets extending longitudinally along opposite sides of the heating chamber or oven. Each of the carriages 11 consists of a frame 12 provided with a pair of wheels or rollers 18 on opposite sides and carrying a platform or hearth 14 of refractory material on which the loaves of bread or other material to be baked may be directly placed.

In order that the carriages or hearths 11 may move from one end of the heating chamber to the other under the influence of gravity, the tracks 10 are given a suitable inclination to the horizontal so that said carriages tend to move from the charging to the discharging end of the heating chamber. In a second and preferably similar chamber 2ª on the top and outside of the chamber 1ª, I mount a second pair of tracks 15, which are inclined downwardly from the discharge end toward the charging end of the baking chamber. In order to transfer the carriages or hearths 11 from the track 15 to the tracks 10, I may provide the apparatus shown in Figs. 4 and 6, which consists of a pair of chains 16 on each side of the charging end of the heating or baking chamber mounted on sprocket wheels 17 carried on a frame 18 or other suitable structure. The chains of each pair serve to support a series of short track sections 19 and are so mounted and proportioned that when two sets of these sections are respectively opposite the ends of the two rails 15, another similar pair of said sections is opposite the ends of the tracks 10. For the purpose of controlling the operation of this lowering device or elevator I provide any suitable form of retarding and holding device or brake as well as a catch, and in the present instance I have illustrated each of the upper sprocket wheels 17 of each pair as provided with a pulley 20 on which a band brake operates; the two brakes being designed to exert a greater or less retarding force on the sprocket wheels depending on their adjustment. A hand lever 24 having one or more arms forming catches normally retains one pair of track sections 19 in line with the tracks 10 so that a carriage may be permitted to run from the tracks 15 onto a pair of the track sections 19 opposite the ends of the same. Thereafter operation of the lever 24 releases the track sections of both chains, and under the action of gravity the carriage causes movement of said chains 16 until they come into such positions that the supporting track sections are opposite the ends of the track 10. The lever 24 is so acted on by a suitable spring that its hooked arms 27 are normally held in the paths of the two sets of track sections 19 and stop the same in the positions above noted.

In order to prevent injury and possible blocking of the apparatus by reason of a number of carriages pressing against each other at the lower end of the upper track 15, I provide means whereby but a single carriage at a time is permitted to run on to the upper pair of track sections 19 of the elevator. For this purpose I provide a transverse shaft 28 carrying one or more escapement levers 29 and having an arm 30 connected through a link 31, a bell crank lever 32 and a second link 33 with an operating lever 34.

The escapement lever 29 is of such design that when held in its normal position by means of a spring 35, its forward end engages an abutment or projection 36 on a carriage 11; it being understood of course that if there are two levers 29 there is likewise a pair of said projections. The length of each lever is such that when turned to raise its forward end out of engagement with the carriage projection 36, its rearward end is lowered immediately in front of the similar projection of another car, so that while the first car is released to move under the action of gravity onto the track sections 19, the succeeding cars are held from movement until such time as the forward end of the lever 29 is again lowered. When this occurs, the entire line of carriages moves forward until stopped by the engagement of the projection 30 of the foremost carriage with the forward end of the said lever.

In order to prevent the entrance of cold air into the heating chamber or oven as well as to prevent the escape of steam therefrom, I provide a pair of doors 37 and 38, which may be counterweighted as shown and arranged to be alternately operated by any suitable means, such for example as chain wheels connected to the shafts 39 and 40 which are extended outside of the heating chamber for their reception.

At the discharging end of the heating chamber, I provide means whereby the carriages are successively delivered, and, after the removal of their load, are run on to the upper end of the tracks 15. For this purpose I provide an elevator consisting of a frame 43 carrying on each side of the heating chamber a pair of shafts 44 and 45. Each of these has fixed to it a pair of sprocket wheels which serve to support two endless sprocket chains 46 carrying and connected together by, track sections 47 capable of being brought into line with the discharge ends of the tracks 10 and the upper charge ends of the tracks 15; the distance apart ends of the tracks 15; the distance apart of successive track sections on said chains being equal to the distance between said ends of the tracks 10 and 15.

For positively driving the chains 46 I provide a motor 48 connected through worm gearing with a shaft 49 which is connected to the shafts 44 through the beveled gearing shown. This discharge end of the tracks 10 is likewise provided with some escapement device whereby but a single carriage 11 is permitted to move onto the track section 47 at the end of said tracks and for this purpose one or more escapement levers 50 may be provided. These levers, like the levers 29, are designed to coöperate with the stops or abutments 36 on the carriages or hearths 11 as heretofore described and they are operated at will by means of an actuating rod 21 connected to an arm 52 projecting from the shaft 53 on which said lever or levers may be mounted.

A door 54 is provided at the discharge end of the heating chamber and is preferably counterbalanced by a pair of weights of which one is shown at 55. Any suitable form of motor controlling apparatus may be provided whereby the motor 48 may be started at will when it is desired to elevate a carriage and thereafter be caused to stop when the carriage has been brought into such position that the rail sections 47 are in line with the rails or tracks 15, but as such devices are well known and since the detail construction of a suitable controller forms in itself no part of my invention, I have not illustrated it. If desired some device may also be provided whereby each pair of rail sections 47 is forwardly tilted as it approaches its position in line with the rails 15 in order to cause the carriage to be automatically caused to run off of said sections onto the rails 15 as soon as the motor 48 has brought one pair of these sections to the proper height. For this purpose I may connect to the forward ends of each of the rail sections 47 an arm 56 which will engage a cam 57 just before such sections come into line with the rails 15, thereby giving them the forward pitch necessary to cause the automatic running off of the carriage.

Under operating conditions the furnaces 2 are fired in the well known manner and the liquid in the lower ends of the tubes or containers 8 and 9 being heated and vaporized, moves from the lower ends thereof into the cooler upper portions within the heating chamber 1ª, thereby heating this to a predetermined degree. One of a number of the carriages previously mounted on the tracks 15 is then permitted to run onto the upper pair of rail sections 19 by moving upwardly the link 33 through the handle 34 and thereby swinging the catch lever or levers 29 so as to cause its forward end to release the part 36 of this first carriage, which then runs onto said rail or track sections. Thereafter the next carriage, which has hitherto been held from moving forward by the rear end of the lever 29, is allowed to move forward when the operating handle 34 is returned to its normal position, until the front end of said lever engages its part 36. By properly operating the handle 24 the operator releases the lower pair of track sections 19 and the elevator is permitted to lower the carriage thereon under the action of gravity until those sections supporting said carriage strike the hooked arm of said lever 24. The loaves of bread or other material to be baked are now placed on the carriage and by suitable manipulation of the shafts 39 and 40, the door 37 is raised after the door 38 has been closed, whereupon the loaded carriage is moved into the space between said two doors 37 and 38. Thereafter the door 37 is closed and the door 38 opened so that the carriage is permitted to enter the heating chamber. It is to be understood that this latter at the beginning of operations is filled throughout its length with empty carriages and it is obvious that the time each carriage remains within it depends on the rate at which the carriages are removed from its lower end, inasmuch as they at all times tend to move toward said end under the action of gravity due to the inclination of the tracks 10. If therefore, it be necessary that the material on the carriages be exposed to the temperature of the heating chamber for a period of thirty five minutes and if the said chamber, when full, is of such length as to hold seventy carriages, then one carriage must be removed every half minute. Since the bread is exposed first to the heating action of the tubes from furnaces on one side of the oven and is thereafter exposed to the action of those on the opposite side, it finally reaches the lower or discharge end uniformly baked.

In order to prevent the lowermost carriage from striking the outlet door 54, it is engaged by the hooked end of the lever 50 as shown in Fig. 5, and when it is desired to remove the carriage with its baked material from the heating chamber, the bar 51 is pushed inwardly after the door 54 has been opened, thereby so moving the said lever 50 as to permit the first carriage to move under the action of gravity onto the track sections 47 which are in line with the track 10. The finished loaves may now be removed. The motor 48 is then started, thus causing the chains 46 to be driven in such a direction that those track sections 47 which support the carriage are with it moved upwardly. As said carriage approaches the upper part of the elevator, the track sections 47 are tilted forwardly by reason of the engagement of their arms 56 with the fixed cam surface 57 on the framework or oven structure, and as a result when said sections have been finally brought into line with the tracks 15 and the motor 48 stopped either automatically or by hand, the carriage runs off of said sections onto the tracks 15 under the action of gravity. It is to be noted that these latter tracks are inclosed in the chamber 2ª which is similar to the chamber 2 and is heated by tubes 8ª and 8ᵇ whose lower ends extend into the furnace as shown in Fig. 3. The carriages in the same are thereby kept hot. Since the tracks 15 are forwardly inclined, the carriages discharged onto them rest one against the other in a line whose forward end is held by the lever 29; it being understood that the carriages are loaded and allowed to run into the heating chamber at predetermined intervals and are similarly removed from the lower end, in order that the operation may be a continuous one and the material on the carriages be properly baked.

As will be understood by those skilled in this art, the elongated chambers with the tracks, carriages and apparatus for transferring said carriages from one chamber to the other may under certain conditions be used without the furnaces and their heating pipes without departing from my invention, since such an apparatus may be employed for receiving and holding dough while it is raising and immediately prior to its introduction into the baking apparatus above described and illustrated.

I claim:—

1. The combination of a heating chamber having an inclined set of tracks; a second series of oppositely inclined tracks mounted above the heating chamber; a series of carriages operative on the tracks; means for transferring said carriages from the upper tracks to one end of the tracks in the heating chamber; an elevator for transferring carriages from the opposite end of the tracks in the heating chamber to the upper set of tracks; with a device operable from a point adjacent the elevator for insuring the delivery of but a single carriage at a time to said elevator.

2. The combination of a heating chamber having an inclined set of tracks; a second series of oppositely inclined tracks mounted above the heating chamber; a series of carriages operative on the tracks; means for transferring said carriages from the upper tracks to one end of the tracks in the heating chamber; an elevator for transferring carriages from the opposite end of the tracks in the heating chamber to the upper set of tracks; with means for automatically causing the discharge of the cars from the elevator onto the upper tracks.

In testimony whereof, I have signed my name to this specification, in the presence of two subscribing witnesses.

CHARLES F. FREIHOFER.

Witnesses:
WILLIAM E. BRADLEY,
WM. A. BARR.